US009225944B2

(12) United States Patent
Kingsley

(10) Patent No.: US 9,225,944 B2
(45) Date of Patent: Dec. 29, 2015

(54) METHOD AND SYSTEM FOR DISPLAYING A COVERAGE AREA OF A CAMERA IN A DATA CENTER

(75) Inventor: Scott Michael Kingsley, Attleboro, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 879 days.

(21) Appl. No.: 13/227,571

(22) Filed: Sep. 8, 2011

(65) Prior Publication Data
US 2013/0063476 A1 Mar. 14, 2013

(51) Int. Cl.
*H04N 7/18* (2006.01)
*H04N 5/232* (2006.01)
*G05B 23/02* (2006.01)
*H04N 5/247* (2006.01)

(52) U.S. Cl.
CPC ............... *H04N 7/185* (2013.01); *G05B 23/02* (2013.01); *G05B 23/0272* (2013.01); *H04N 5/23216* (2013.01); *H04N 5/247* (2013.01)

(58) Field of Classification Search
CPC ..... G08B 13/196; H04N 7/181; H04N 7/185; H04N 5/247; H04N 5/23216
USPC ................... 345/418–427, 619; 348/153–159
See application file for complete search history.

(56) References Cited

U.S. PATENT DOCUMENTS

| 4,992,866 | A | * | 2/1991 | Morgan | 348/159 |
|---|---|---|---|---|---|
| 4,992,868 | A | | 2/1991 | Holtz | |
| 5,061,916 | A | | 10/1991 | French et al. | |
| 5,926,210 | A | | 7/1999 | Hackett et al. | |
| 6,018,497 | A | | 1/2000 | Gunasekera | |
| 6,188,973 | B1 | | 2/2001 | Martinez et al. | |
| 6,208,379 | B1 | * | 3/2001 | Oya et al. | 348/143 |
| 6,714,977 | B1 | | 3/2004 | Fowler et al. | |
| 6,919,921 | B1 | | 7/2005 | Morota et al. | |
| 7,095,321 | B2 | | 8/2006 | Primm et al. | |
| 7,161,615 | B2 | * | 1/2007 | Pretzer et al. | 348/143 |
| 7,242,295 | B1 | | 7/2007 | Milinusic et al. | |
| 7,392,309 | B2 | | 6/2008 | Childers et al. | |
| 7,844,702 | B1 | | 11/2010 | Manczak et al. | |
| 7,856,495 | B2 | * | 12/2010 | Chainer et al. | 709/223 |
| 8,780,177 | B2 | * | 7/2014 | Eccles et al. | 348/46 |

(Continued)

FOREIGN PATENT DOCUMENTS

WO  WO 2010077389 A2 * 7/2010

OTHER PUBLICATIONS

Notification of Transmittal of the International Search Report and the Written Opinion of the International Searching Authority from corresponding PCT/US2012/053975 dated Jan. 18, 2013.

*Primary Examiner* — Xiao Wu
*Assistant Examiner* — Michael J Cobb
(74) *Attorney, Agent, or Firm* — Lando & Anastasi, LLP

(57) ABSTRACT

A system and method for depicting a coverage area of at least one camera within a graphical representation of a data center is disclosed. In one aspect, a method includes establishing, by a computer, a representation of the at least one camera within the graphical representation of the data center, determining at least one device associated with the at least one camera, determining at least two points within the graphical representation of the data center marking outer boundaries of the at least one device, and displaying the coverage area between the outer boundaries and the representation of at least one camera.

20 Claims, 10 Drawing Sheets

(56) References Cited

U.S. PATENT DOCUMENTS

| | | |
|---|---|---|
| 2001/0034588 A1 | 10/2001 | Agrawals et al. |
| 2002/0140698 A1* | 10/2002 | Robertson ............... G06T 15/20 345/427 |
| 2002/0140819 A1 | 10/2002 | Waehner et al. |
| 2003/0046339 A1 | 3/2003 | Ip |
| 2003/0123703 A1* | 7/2003 | Pavlidis et al. ............... 382/103 |
| 2005/0132414 A1* | 6/2005 | Bentley et al. ................ 725/105 |
| 2005/0246436 A1 | 11/2005 | Day et al. |
| 2005/0264416 A1* | 12/2005 | Maurer ................... 340/539.13 |
| 2006/0187831 A1* | 8/2006 | Justen ........................... 370/229 |
| 2006/0267974 A1 | 11/2006 | Kato et al. |
| 2006/0271700 A1 | 11/2006 | Kawai et al. |
| 2007/0035627 A1* | 2/2007 | Cleary et al. .................. 348/159 |
| 2007/0039030 A1* | 2/2007 | Romanowich et al. ....... 725/105 |
| 2007/0078635 A1* | 4/2007 | Rasmussen et al. ............... 703/1 |
| 2007/0130537 A1* | 6/2007 | Chiu ................. G06F 17/30899 715/792 |
| 2008/0129825 A1* | 6/2008 | DeAngelis et al. ........... 348/169 |
| 2008/0317021 A1 | 12/2008 | Ives et al. |
| 2009/0002157 A1* | 1/2009 | Donovan .................. H04N 7/18 340/540 |
| 2009/0113323 A1 | 4/2009 | Zhao et al. |
| 2009/0144393 A1 | 6/2009 | Kudo |
| 2009/0256908 A1* | 10/2009 | Chen et al. ................... 348/143 |
| 2009/0262206 A1* | 10/2009 | Park .......................... 348/218.1 |
| 2010/0002071 A1* | 1/2010 | Ahiska ............................ 348/36 |
| 2010/0057935 A1 | 3/2010 | Kawai et al. |
| 2010/0141767 A1* | 6/2010 | Mohanty et al. .............. 348/159 |
| 2010/0259539 A1 | 10/2010 | Papanikolopoulos et al. |
| 2010/0281147 A1 | 11/2010 | O'Leary et al. |
| 2011/0087559 A1* | 4/2011 | Paul et al. ................... 705/26.81 |
| 2011/0173235 A1* | 7/2011 | Aman et al. ................... 707/792 |
| 2011/0191454 A1 | 8/2011 | Joukov |
| 2012/0096169 A1 | 4/2012 | Oeda |
| 2012/0119879 A1* | 5/2012 | Estes et al. ..................... 340/8.1 |
| 2012/0313781 A1 | 12/2012 | Barker et al. |
| 2012/0327051 A1* | 12/2012 | Davies ...................... G09G 5/10 345/207 |
| 2013/0063592 A1 | 3/2013 | Kingsley |

\* cited by examiner

Alarm View

| Severity | Equipment | Camera View | Location | Description |
|---|---|---|---|---|
| Warning | ATS 1 | Available | Hallway | |
| Warning | UPS 2 | Available | Room 1 | |
| Error | Door_Sns | Not Available | Room 2 | |
| Warning | Door/Rack 1 | Available | Room 2 | |

FIG. 5

METHOD AND SYSTEM FOR DISPLAYING A COVERAGE AREA OF A CAMERA IN A DATA CENTER

BACKGROUND

1. Field of Invention

At least one embodiment relates generally to methods and systems for obtaining images of devices in a data center, and more specifically, to a method and system for displaying a coverage area of a camera via a visual interface.

2. Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate these communications, power and cooling elements. In some data center configurations, rows of racks are organized into hot and cold aisles to decrease the cost associated with cooling the information technology equipment. These characteristics make data centers a cost effective way to deliver the computing power required by many software applications.

Various processes and software applications have been developed to aid data center personnel in configuring, managing and monitoring the operational behavior of devices located within a data center. Some of these tools allow users to adjust values assigned to one or more locally-stored, pre-defined settings of the device, and thereby affect how the device operates.

SUMMARY

Processes and software applications for data center management technology can incorporate various remote monitoring functions, for example, remotely monitoring networking equipment to improve security, prevent equipment failure, and aid in maintaining network operability. However, many typical systems for remotely monitoring locations and equipment suffer from deficiencies associated with displaying and representing monitoring data to end-users. For example, data center management systems can provide camera views for various locations within the data center. However, such views are often limited to displaying lists of camera and visual feeds available from those cameras. Alarms or warnings generated by the management system are typically presented in a tabular view without a way to quickly find out more information as to the origination of those alarms. With such systems, the end-user may have to manually sort through various camera inputs to determine the source of alarms in the data center. Failure to understand the cause of an alarm may lead to elevated security risks or potential damage to the equipment.

A first aspect of the invention is directed to a computer-implemented method for depicting a coverage area of at least one camera within a graphical representation of a data center. The method including establishing, by a computer, a representation of the at least one camera within the graphical representation of the data center, determining at least one device associated with the at least one camera, determining at least two points within the graphical representation of the data center marking outer boundaries of the at least one device, and displaying the coverage area between the outer boundaries and the representation of at least one camera.

The method may further comprise displaying a representation of the at least one device within the coverage area and a representation of another device outside the coverage area. In the method, displaying the coverage area between the outer boundaries and the representation of the at least one camera may further comprise depicting the coverage area as a circle segment encompassing the representation of at least one camera and the at least two points.

The method may further comprise establishing a coordinate system within the graphical representation of the data center. In the method, establishing the representation of the at least one camera within the graphical representation of the data center may further comprise determining camera coordinates within the coordinate system that mark the representation of the at least one camera within the graphical representation of the data center. Additionally in the method, determining the at least two points within the graphical representation of the data center marking outer boundaries further may further comprise establishing a representation of the at least one device within the graphical representation of the data center, the representation of the at least one device having a plurality of vertices, determining a plurality of vertex coordinates within the coordinate system that mark the plurality of vertices, each of the plurality of vertex coordinates corresponding to a respective one of the plurality of vertices, and determining a set of outer boundary coordinates within the coordinate system for at least two of the plurality of vertices that mark outer boundaries of the representation of the at least one device relative to the representation of the at least one camera.

In the method, determining the set of outer boundary coordinates may further comprise calculating a length between at least one set of vertex coordinates of the plurality of vertex coordinates and the camera coordinates, and calculating an angle defined by the camera coordinates, a first subset of the plurality of vertex coordinates and a second subset of the plurality of vertex coordinates, the angle having a vertex defined by the camera coordinates. Further in the method, calculating the length may further comprise establishing a right triangle with a hypotenuse between the at least one set of vertex coordinates and the camera coordinates. Additionally in the method, the at least one device may include a first device having at least one first vertex marked within the coordinate system by a first set of vertex coordinates and a second device having at least one second vertex marked within the coordinate system by a second set of vertex coordinates. In the method, calculating the angle may comprise calculating a total angle defined by the camera coordinates, the first set of vertex coordinates and the second set of vertex coordinates, the total angle having a vertex defined by the camera coordinates.

The method may further comprise determining an arc radius by comparing the length to at least one other length calculated between the camera coordinates and at least one second set of vertex coordinates of the plurality of vertex coordinates, and determining an arc angle by comparing the angle to at least one other angle defined by the camera coordinates, a first set of vertex coordinates marking at least one first vertex of the plurality of vertices and a second set of coordinates marking at least one second vertex of the plurality of vertices, the at least one other angle having a vertex defined by the camera coordinates. In the method, displaying the coverage area may further comprise depicting an arc having the arc angle and the arc radius.

Another aspect of the invention is directed to a data center management system for displaying a coverage area of at least one camera within a graphical representation of a data center.

The system includes an input configured to receive a graphical representation of the data center, a controller coupled to the input and configured to establish a graphical representation of the at least one camera within the graphical representation of the data center, determine at least one device associated with the at least one camera, and determine at least two points within the graphical representation of the data center marking outer boundaries of the at least one device, and an output coupled to the controller and configured to display the coverage area between the outer boundaries and the at least one camera.

The output may be further configured to display a representation of the at least one device within the coverage area and a representation of another device outside the coverage area. The controller may be further configured to depict the coverage area as a circle segment encompassing the representation of at least one camera and the at least two points. Additionally, the controller may be further configured to establish a coordinate system within the graphical representation of the data center. In the system, the controller may be further configured to establish the graphical representation of the at least one camera by determining camera coordinates within the coordinate system that mark the representation of the at least one camera within the graphical representation of the data center. Further in the system, the controller may be further configured to determine the at least two points within the graphical representation of the data center marking the outer boundaries by establishing a representation of the at least one device within the graphical representation of the data center, the representation of the at least one device having a plurality of vertices, determining a plurality of vertex coordinates within the coordinate system that mark the plurality of vertices, each of the plurality of vertex coordinates corresponding to a respective one of the plurality of vertices, and determining a set of outer boundary coordinates within the coordinate system for at least two of the plurality of vertices that mark outer boundaries of the representation of the at least one device relative to the representation of the at least one camera.

The controller may be is further configured to calculate a length between at least one set of vertex coordinates of the plurality of vertex coordinates and the camera coordinates, and calculate an angle defined by the camera coordinates, a first subset of the plurality of vertex coordinates and a second subset of the plurality of vertex coordinates, the angle having a vertex defined by the camera coordinates. Additionally, the controller may be further configured to calculate the length by establishing a right triangle with a hypotenuse between the at least one set of vertex coordinates and the camera coordinates.

The at least one device may include a first device having at least one first vertex marked within the coordinate system by a first set of vertex coordinates and a second device having at least one second vertex marked within the coordinate system by a second set of vertex coordinates. In the system, the controller may be further configured to calculate the angle by calculating a total angle defined by the camera coordinates, the first set of vertex coordinates and the second set of vertex coordinates, the total angle having a vertex defined by the camera coordinates.

Additionally, the controller may be further configured to determine an arc radius by comparing the length to at least one other length calculated between the camera coordinates and at least one second set of vertex coordinates of the plurality of vertex coordinates, and determine an arc angle by comparing the angle to at least one other angle defined by the camera coordinates, a first set of vertex coordinates marking at least one first vertex of the plurality of vertices and a second set of vertex coordinates marking at least one second vertex of the plurality of vertices, the at least one other angle having a vertex defined by the camera coordinates. In the system, the controller may be further configured to display the coverage area by depicting an arc having the arc angle and the arc radius.

Another aspect of the invention is directed to computer readable medium for displaying a coverage area of at least one camera within a graphical representation of a data center having stored thereon sequences of instruction including instructions that will cause a processor to establish a graphical representation of the at least one camera within the graphical representation of the data center, determine at least one device associated with the at least one camera, determine at least two points within the graphical representation of the data center marking outer boundaries of the at least one device, and display the coverage area between the outer boundaries and the at least one camera.

In the computer readable medium, the sequences of instructions may include instructions that will cause the processor to establish a coordinate system within the graphical representation of the data center. The sequences of instructions may further include instructions that will cause the processor to establish the graphical representation of the at least one camera further include instructions that will cause the processor to determine camera coordinates within the coordinate system that mark the representation of the at least one camera within the graphical representation of the data center. The sequences of instructions may further include instructions that will cause the processor to determine the at least two points within the graphical representation of the data center marking the outer boundaries further include instructions that will cause the processor to establish a representation of the at least one device within the graphical representation of the data center, the representation of the at least one device having a plurality of vertices, determine a plurality of vertex coordinates within the coordinate system that mark the plurality of vertices, each of the plurality of vertex coordinates corresponding to a respective one of the plurality of vertices, and determine a set of outer boundary coordinates within the coordinate system for at least two of the plurality of vertices that mark outer boundaries of the representation of the at least one device relative to the representation of the at least one camera.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a schematic diagram of one example of a tabular alarm view screen in an interface according to one embodiment;

DETAILED DESCRIPTION

Systems and methods provided herein present camera images to end-users in a way that minimizes manual search and maximizes response from data center personnel. Users of the system and methods provided herein can determine and eliminate areas or devices in the data center without camera coverage (i.e. blind spots). At least one aspect of the present invention relates to a system and method for determining and associating devices within a camera's coverage area. Another aspect of the present invention relates to a system and method of graphically indicating the camera's coverage area in a graphical representation of the data center. Such a system or method may be implemented with respect to a data center, often using an automated centralized network manager.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace examples including a plurality, and any references in plural to any example, component, embodiment, block, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Distributed Network System

Figure 1:
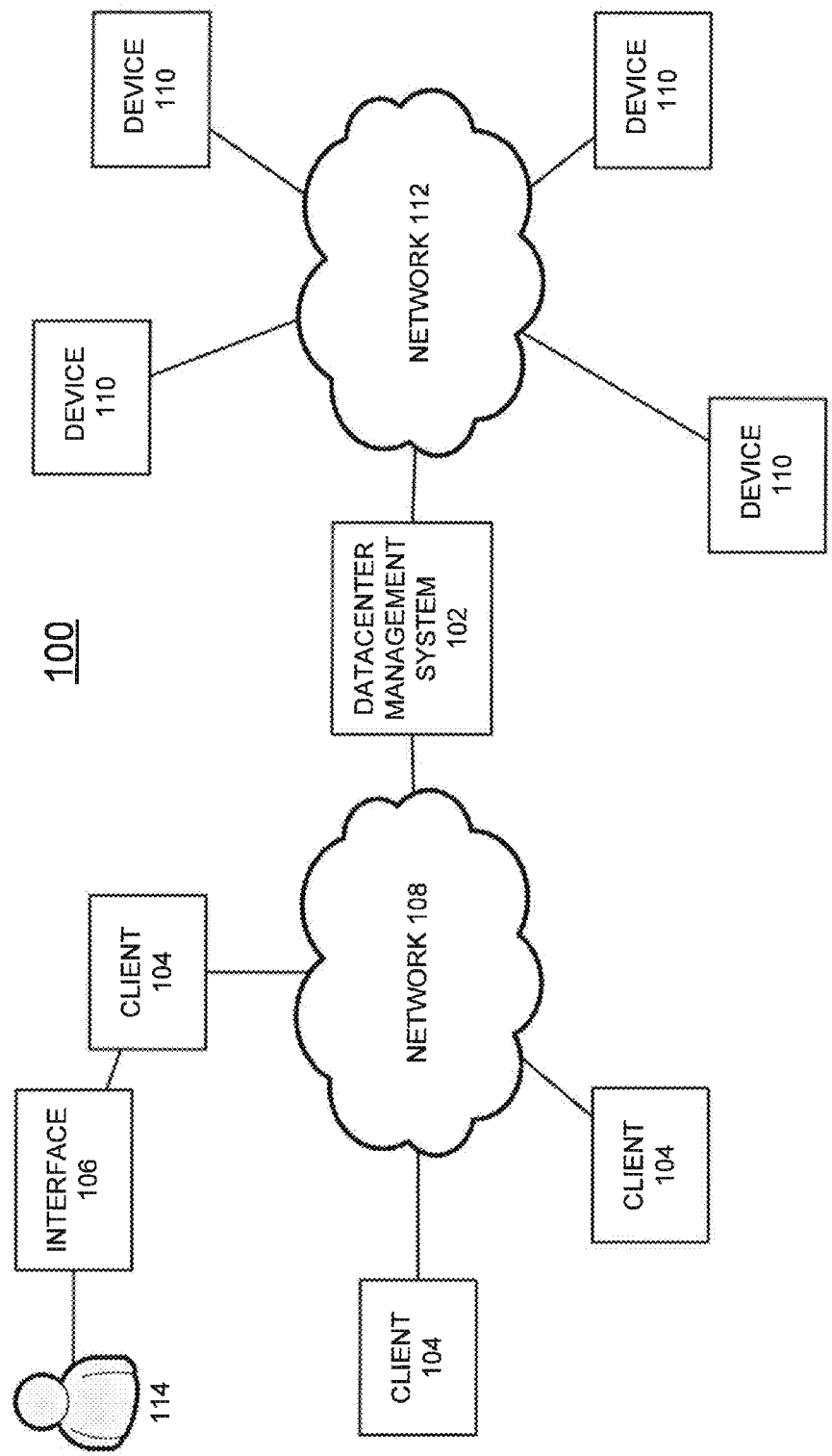
FIG. 1 is a context block diagram of one example of a distributed network system, according to one embodiment.

FIG. 1 shows a context diagram including physical and logical elements of a distributed system 100 according to one example. In this example, the distributed system 100 includes a data center management system 102, a plurality of client systems 104, an interface 106, a user 114, and a plurality of devices 110.

In one example, the devices 110 are situated in one or more locations in a data center. The data center management system 102 may allow one or more users 114 to remotely monitor, manage, enter and modify one or more characteristics or settings of one or more of the devices 110. The client systems 104 may allow the users 114, such as a data center or Information Technology (IT) personnel, to interact with data center management system 102 through the interface 106.

In at least one embodiment, information regarding the data center is entered into data center management system 102 and alerts and warnings for the data center can be provided to the user 114 through the interface 106. The interface 106 may enable the client system 104 to display information to the user 114. Although only one interface 106 is shown, it is appreciated that each client system 104 can include an interface 106. For instance, in one embodiment, the interface 106 is a browser-based user interface rendered by the client 104 and served by the data center management system 102. In another embodiment, the interface 106 is a client program executing on the client 104 that interoperates with a server program resident and executing on the data center management system 102.

In one example, the data center management system 102 is connected to two interconnected networks 108, 112. The interconnected network 108 may connect client systems 104 to the data center management system 102. The interconnected network 112 may connect the one or more devices 110 to the data center management system 102. The data center management system 102 may transfer information to and from the one or more devices 110 through the interconnected network 112. This information may be sensor data, configuration data, and images, as well as other information. The data center management system 102 may store the information and supply that information to one or more client systems 104. The client systems 104 may, for example, access, display and/or manipulate the data associated with the devices 110. Further, the client systems 104 may acquire from the data center management system 102, instructions, objects, classes, and programs, among others, for accessing, displaying and manipulating the data associated with the devices 110, as stored on the data center management system 102.

In some embodiments, these instructions, objects, classes, and programs are implemented within client-server architecture. In these embodiments, a client application resident on the client system 104 communicates with a server application resident on the data center management system 102 via the network 108. In other embodiments, the instructions, objects, classes, and programs are implemented within a web-based architecture. In these embodiments, a browser executing on the client system 104 renders executable and non-executable content served by a web server executing on the data center management system 102 via the network 108.

The devices 110 may include any device housed within a data center. Examples of devices include computer systems, servers, uninterruptible power supplies, routers, cooling systems, lighting, environmental sensors, such as temperature, humidity and airflow sensors, and security devices, such as security cameras, door contact sensors, or other types of devices typically found in a data center environment.

It should be understood that devices may include virtual devices, such as hardware emulated by software running on another computer, or logical groups of devices, such as server farms or disk arrays. The devices 110 may, for example, communicate with the data center management system 102 through a variety of protocols, such as HTTP, as well as other protocols.

The client systems 104 may communicate with the management system 102 via a web browser. In one example, the web browser may be JAVA enabled and via one or more applets, may enable the client system to access, display, and/or manipulate data stored on the data center management system 102. For example, the client systems 104 may be able to access information associated with sensor data, configuration data, image data, network appliance status, and map configuration data, among other types of data. The client systems 104 may then display the data in various formats including tables, maps, images, videos and graphs, among others.

The interconnected networks 108, 112 may take various forms. These forms may include a global network, wide area network, local area network, wireless network, phone systems, and satellite communications systems, among others. Further, these networks and systems may use various methods, protocols, and standards, including, among others, Ethernet, Wireless Ethernet, TCP/IP, HTTP, FTP, SNMP, Bluetooth, as well as other protocols. In addition, various security methods may be used in transferring data, including SSL, among others. Further, a user-controlled level of security may be provided. A standard protocol may allow the client system and server to be physically located on separate sides of a firewall, adding another level of security to the customer. Although FIG. 1 depicts networks 108 and 112 as separate networks, the scope of the embodiments disclosed herein is not limited to such a network configuration. Other embodiments may operate using a single network, three networks or more than three networks.

As shown, the distributed system 100 can be specially configured in accordance with the presently disclosed embodiments. The system structure and content recited with regard to FIG. 1 are shown for exemplary purposes only and are not intended to limit the embodiments to the specific structure and content shown in FIG. 1. As will be apparent to one of ordinary skill in the art, many variant system structures can be architected without deviating from the scope of the presently disclosed embodiments. The particular arrangement presented in FIG. 1 was chosen to promote clarity.

Information may flow between the elements, components and subsystems depicted in FIG. 1 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Map View Interface

Figure 2:
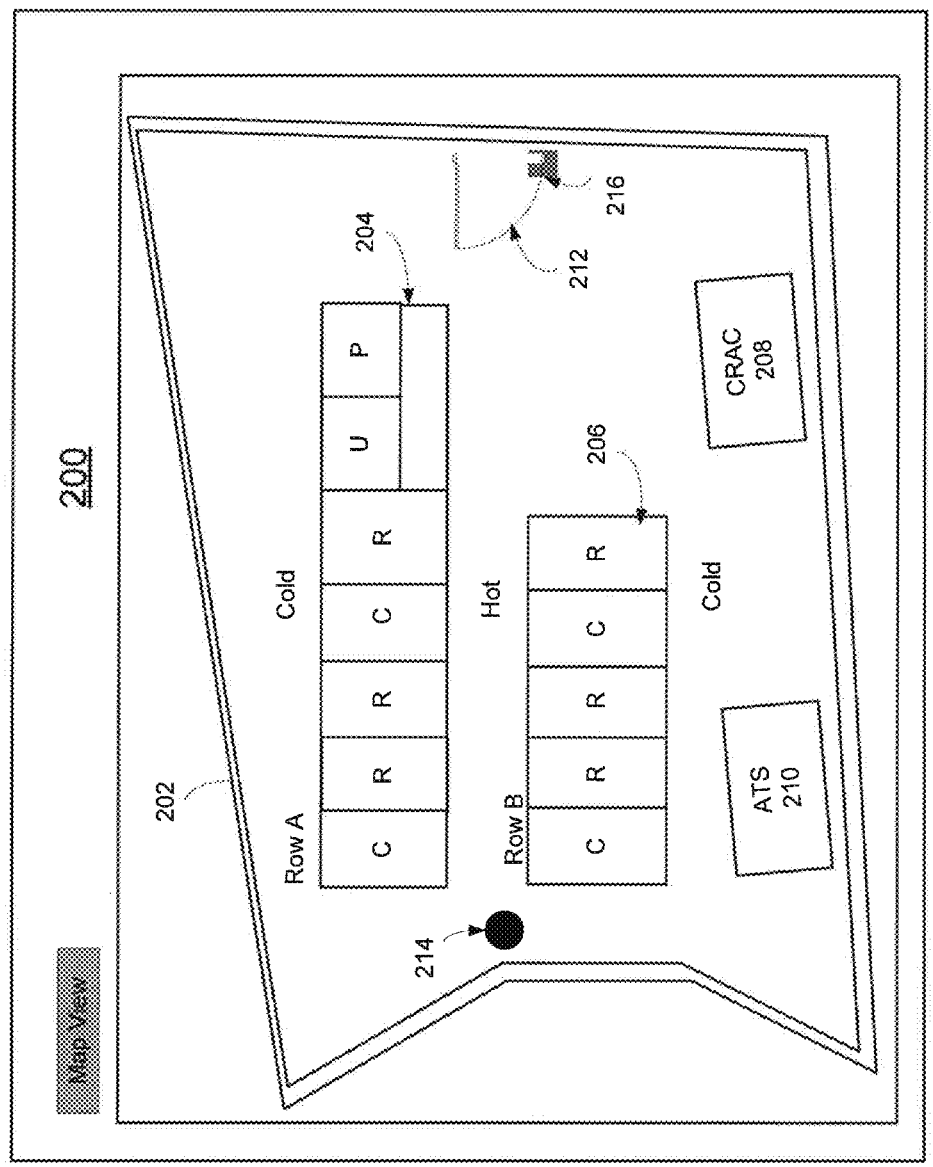
FIG. 2 is a schematic diagram of one example of a graphical representation of a data center in an interface according to one embodiment.

FIG. 2 shows an example of a map view interface 200 that may be generated using the data center management system 102 and displayed to the user 114 using the interface 106 of one or more client systems 104. In one example, map view interface 200 is an application on an automated centralized network manager.

Map view interface 200 may display the current layout of one or more devices 110 in the data center, as well as other features or characteristics present in the data center, which may be represented as graphic images or icons. Map view interface 200 may display a two-dimensional view or three-dimensional graphical representation of the data center and include two or three-dimensional representations of the devices 110 within the data center. The map view interface 200 may further allow the user to edit representations of the devices and features of the data center shown in the map view to add, remove or move equipment in the data center.

The representations or icons for the various devices 110 may be arranged according to physical location within the data center, or within an equipment rack or cabinet. Further, the device icons may be superimposed on an image indicative of the location for example, a schematic, a graphic image, or a blue print, among others. In some examples, the shape of the icon may represent the type or version of the device. In addition, the image may change in response to events associated with the devices.

The map view interface 200 of the data center may depict a variety of enclosures, such as equipment racks and cabinets, which may include one or more devices within the enclosures. For example, one equipment rack can include various devices such as servers, automatic transfer switches, electrical routing devices, as well as cables and other computer equipment. The map view interface 200 may allow the presentation of various attributes generated from multiple related sensors in the same enclosure.

The data center can also include other devices and features such as an automatic transfer switch (ATS) 210, a computer room air conditioning (CRAC) unit 208, camera units 214, doors 212, motion sensing units 216. Each piece of equipment in the data center may include identifiers that indicate the type of rack as well as the racks location in the data center and the power source for the rack. Each rack may include information regarding power and cooling use and availability. Other indicators may be provided on each row to indicate total power and cooling information for each row.

As shown in FIG. 2, the room perimeter 202 shows the exterior walls of the room along with dimensions of a room in the data center. Two rows 204 and 206 outlined in the room are shown in FIG. 2, but more or fewer rows may be included. In one example, the rows are configured in a manner to provide alternating hot and cold aisles. Row 204 includes three equipment racks (labeled "R"), two half-rack cooling units (labeled "C"), a UPS (labeled "U") and a power distribution unit (labeled "P"). Row 206 includes three racks and two cooling units. As additional equipment may be added or removed to each of the rows, the user may edit the configuration to reflect those changes.

In some embodiments, map view interface 200 may display various icons associated with alarms, warnings or errors. These icons may be arranged according to type, location, alarm state, configuration, parameter value, or grouping, among other parameters. In one embodiment, the data representing alarms, errors and warnings can be displayed as a table, as further described below with reference to FIG. 5.

Coverage Areas for Camera Systems

As described above, cameras can be implemented into data centers and can provide remote video imaging of the data center over a network. Such remote video imaging can help maintain security of the equipment despite a lack of a physical presence on site. The camera can be any video imaging system, such as, for example, a charge-coupled device (CCD) imager, and is configured to provide images of data center and devices located within the camera's coverage area. The camera can be mounted on a wall, ceiling or any other location so as to provide an unobstructed view of one part of the data center. Cameras can be included in a camera module which can provide additional sensors or functionality incorporated into it. For example, the camera module can also provide video imaging circuitry and circuitry for sensing an external influence, such as for motion detection sensor, door sensor, or equipment rack sensor. Alternatively, discrete sensors can be placed in the data center, and upon sensing the external influence can provide a signal to the camera or to the data center management system.

In one example, the interface can display to the user video images obtained from all of the cameras within the data center. This interface can provide IT or security personnel the ability to remotely view images from geographically distinct rooms. However, unless these cameras are associated with specific devices displayed in the video images, the user viewing the images may not know which devices are shown in the images.

According to one embodiment, the data center management system 102 can provide for the user to associate enclosures, devices or features in a data center within a coverage area of a camera. By associating the enclosures, devices or features within the coverage area of each camera in the data center, any event associated with (or generated by) a particular device can be quickly linked with footage from a camera associated with that particular device. In one example, the event may be a user requesting and receiving live camera footage associated with the particular device by selecting an option on the device within the map view interface, for example by "right clicking" on the device. In another example, the event may be any external influence detected and processed by the data center management system, for example an alarm generated for an equipment rack based on motion sensed at that equipment rack. Any video images recorded by the camera associated with that equipment rack can be automatically displayed to the user together with the alarm. Furthermore, by visually depicting each camera's coverage area within the map view interface a user can detect areas (or devices) of the data center without camera coverage (i.e. blind spots). Detecting blind spots can allow IT or security personnel to improve security in the data center and adjust or add cameras to eliminate blind spots.

Figure 3:
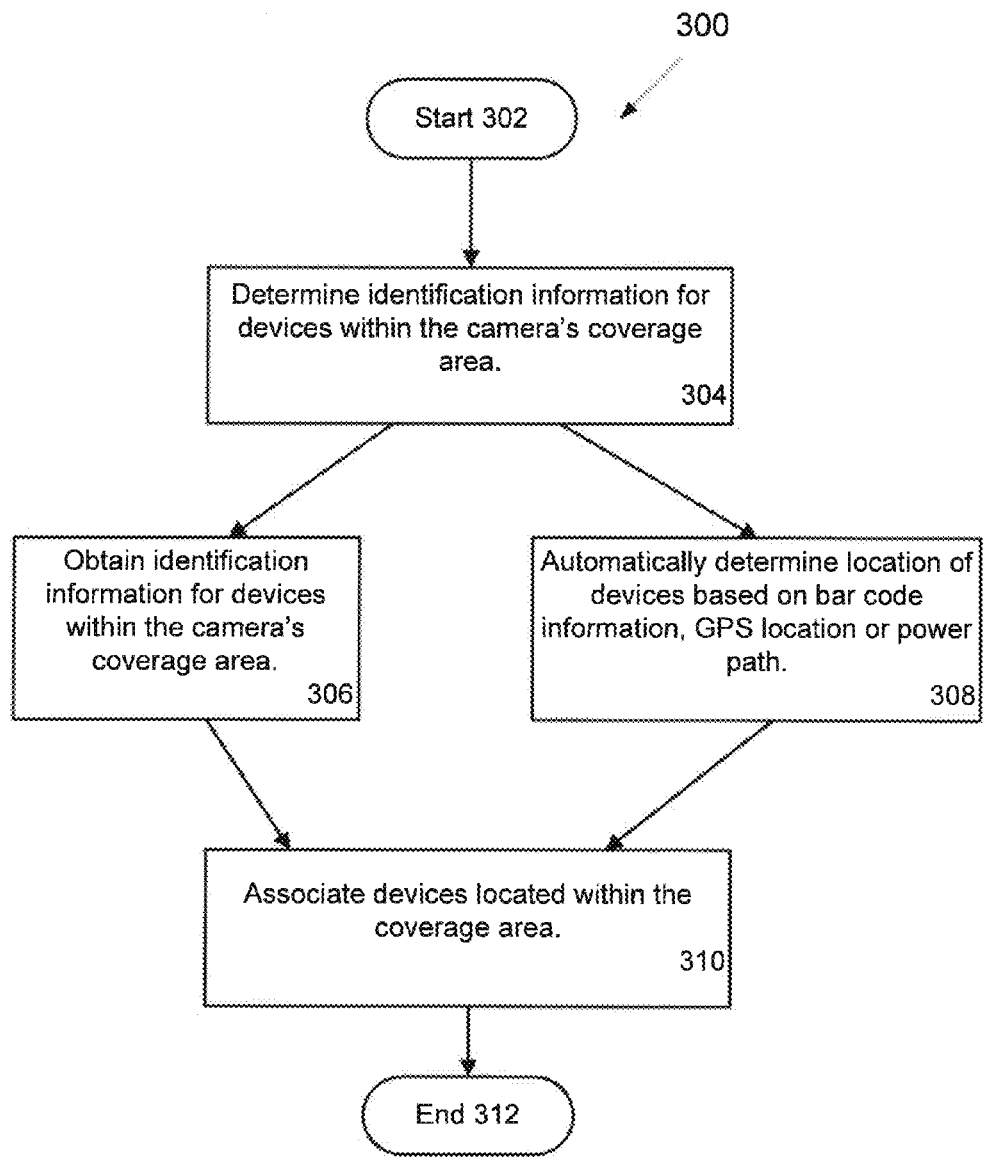
FIG. 3 is a flow diagram of a method of associating devices with a camera's coverage area within the data center according to one embodiment.

FIG. 3 shows one example process 300 for associating devices with a coverage area of a camera according to one embodiment. At block 302, process 300 begins. At block 304, identification information for the devices within a coverage area of the camera can be determined. The identification information can be any information that can allow a user to locate the device in the data center, for example a unique identifier, a physical location (room 1, row A, rack 3), a geographical location (latitude and longitude), or a reference location (coordinates on a graphical representation of the data center). In one embodiment, the identification information can be input into an identification data field associated with each of the devices described above. This identification data field can be populated with identification information at the time of installation or configuration and can be subsequently modified or updated, for example as the location of the device changes. Identification information can be stored in device memory. On request from the data center management system the identification information can be transmitted to the data center management system (block 306). In another embodiment, the identification information can be stored in the database of the data center management system and can be accessed on demand.

In another embodiment, the identification information may be an identifier or a token associated with an enclosure, device or feature of the data center. This identifier can be unique to every enclosure, device or feature and can be stored in the memory of the device and accessed on demand by the data center management system. Alternatively, the identifier can be stored in the database of the data center management system.

In another embodiment where the identification information comprises location information, the location of devices in the camera's coverage area can be determined automatically (block 308) through various methods, for example based on location information obtained from bar codes, GPS locator signal, or the power path of the devices.

In one embodiment, location information of devices in the camera's coverage area can be automatically determined by using the power path of devices in the data center, as described in application Ser. No. 11/766,187, titled METHOD AND SYSTEM FOR DETERMINING PHYSICAL LOCATION OF EQUIPMENT, which is incorporated herein by reference in its entirety. The data center management system can monitor and record power changes that result from normal operation of a power distribution device coupled to a network device. The management system can compare normal power operation to changes in power demand to ascertain the location of the network device based on the location of the power distribution device.

In another embodiment, location information of devices in the camera's coverage area can be automatically determined from bar codes placed on devices and enclosures. A method of acquiring information regarding devices by obtaining an image of a one- or two-dimensional barcode affixed on or near each piece of hardware disclosed in application Ser. No. 13/190,688, titled A METHOD FOR VISUALIZING HARDWARE STATUS BY MEANS OF AUGMENTED REALITY, which is incorporated herein by reference in its entirety. The bar codes include encoded identifying information for the associated device. In one example, the camera can obtain one or more images of the data center location and extract bar code identification information from the images of the bar codes. The bar code identification information can be transmitted to the data center management system, which can determine the location information for the device stored in memory and correlated to the bar code identification information. In another example, the bar code can encode location information directly.

In another embodiment, location information of devices in the camera's coverage area can be automatically determined using GPS location technology. In this embodiment, GPS locator beacons can be placed on the devices and enclosures that can transmit their current location. The data center management system can receive GPS information from the devices and determine the location based on the received GPS information.

Figure 4:
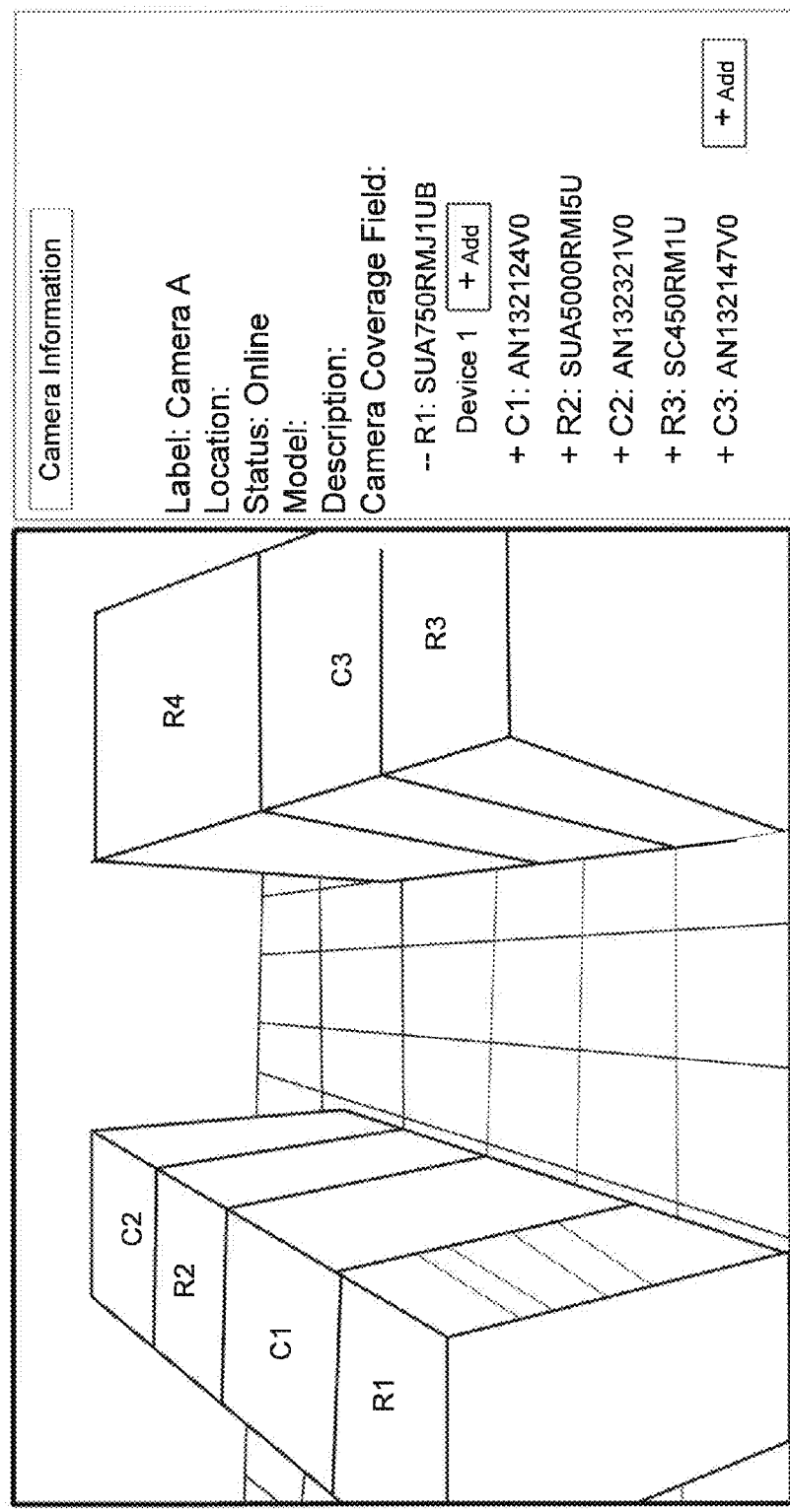
FIG. 4 is a schematic diagram of one example of a camera configuration screen in an interface according to one embodiment.

At block 310, devices are associated with the camera. FIG. 4 shows one example of associating the devices with the camera's coverage area. In one embodiment, the user is presented with a video feed from one of the cameras. By examining the video feed, the user can determine which enclosure and/or devices are in the coverage area of the camera. The identification information of all the enclosures within the coverage area can be input into a coverage area data field associated with each camera. If unique identifiers are used, the unique identifier for all the enclosures within the coverage area can be input into a coverage area data field associated with each camera. If location information is used, the location information for all the enclosures within the coverage area can be input into the coverage area data field.

The identification information for the devices within the enclosures, for example routers, servers, or switches can also be input into the coverage area data field. Furthermore, the identification information for any additional devices, for example PDUs can also be input into the coverage area data field. Additionally, other features of the data center, for example doors and various user access points, as well as sensors for those features, such as door sensors and motion sensors may have identification information associated with them. This identification information can also be input into the coverage data field of the camera.

As events associated with a particular enclosure, device or feature are detected, the data center management system can obtain the identification information for that particular enclosure, device or feature. The data center management system can perform a scan of the camera's coverage area data field for cameras within the data center and match the identification information for the particular enclosure, device or feature with the identification information in the data field.

In another example, the data center management system can periodically perform scans of the camera's coverage area data field, match the identification information and store the associated devices with the coverage area data field in the data center management system database. The data center management system can also perform periodic scans of the camera coverage data field to determine if any associations stored in the system should be changed. For example, if the devices are moved outside of the camera's coverage area or if the camera has been moved or rotated away from the devices.

For example, a motion sensor activated due to movement within an equipment aisle can trigger the data center management system to generate an alert to the user in the form of an alert window. Coverage area data fields for cameras within the data center may be scanned and the identification information for the motion sensor may be matched with identification information stored in the coverage area data field for a particular camera. The alert window can be displayed to the user with specific information regarding the motion sensor, for example the location of the sensor, the time and place of the activation, as well as other information. The alert window can further include live video images from the associated camera for the aisle of the data center that encompasses the motion sensor.

In another example, the association is performed automatically by comparing the location information of the device, the location of the camera and a predetermined value of the coverage area. The predetermined value can be based on camera model and placement of the camera and can represent the magnitude of the camera's coverage. If the location information of the devices falls within the value of the coverage area, the associated device is stored in the data center management system. At block 312, the process ends.

Recorded or live camera footage associated with the devices can be displayed to the user in response to detecting an event by the data center management system. As shown in FIG. 5, alerts generated by the data center management system can be displayed to the user, along with a way to access the recorded or live camera footage. For example, the table may display a current value of a parameter associated with a sensor on or connected to a device. The table may also display alarm states associated with the device, for example representing the severity of the alarm state. Further, the table may display configuration parameters and data associated with devices, for example the location of the devices, a description of the alarm, and whether a camera view is available. The table may further enable manipulation and changing of the values within the table. Other methods of visually directing the user to the video footage can also be used. If a camera view is available, the user can access the camera view, for example by clicking on a hyperlink, and can be directed to video footage of the device associated with the alarm from the camera associated with the device.

Figure 6:
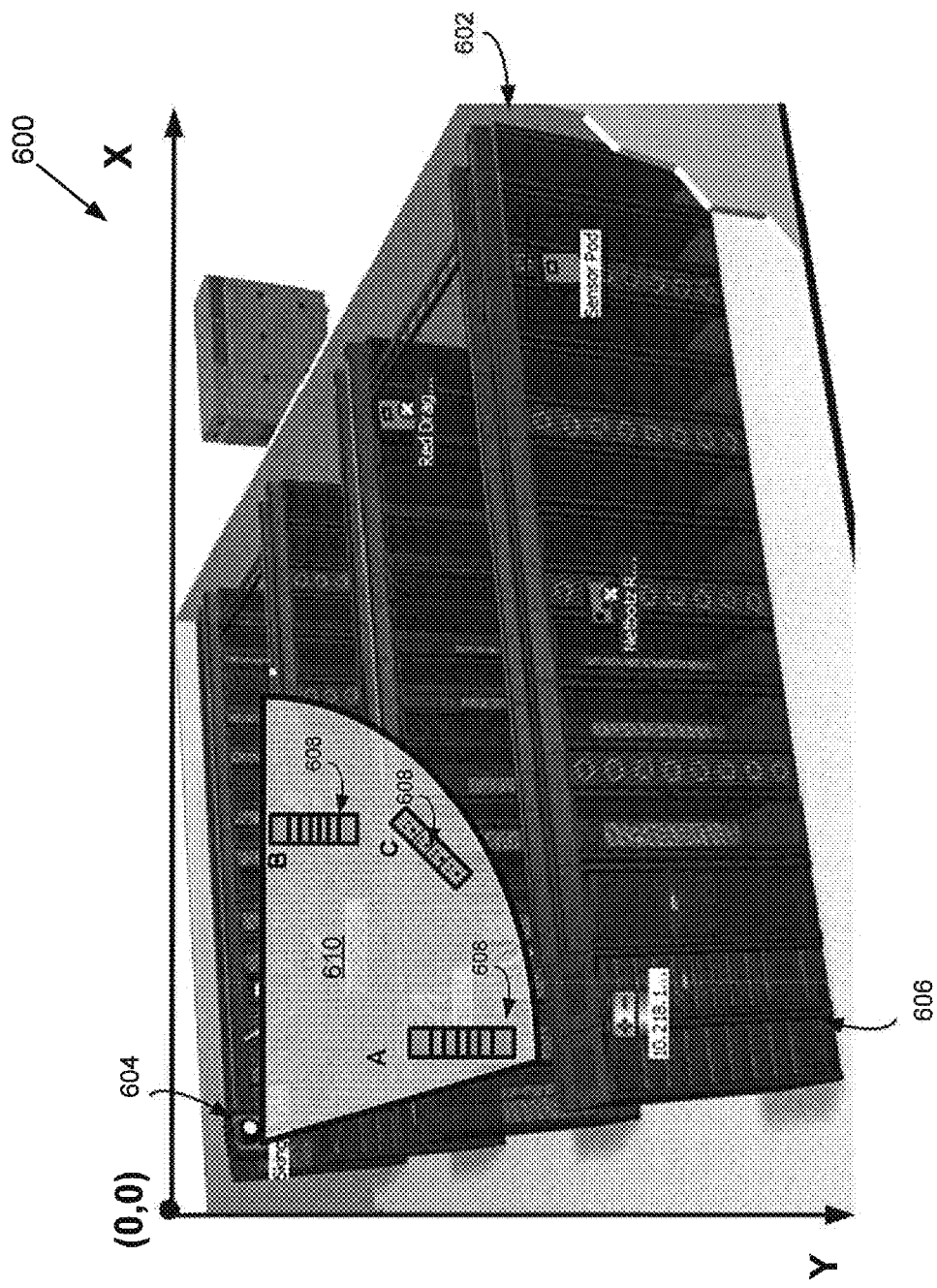
FIG. 6 is a diagram of one example of a graphical representation of a data center including a camera's coverage area in an interface according to one embodiment.

According to some embodiments, detecting blind spots in a data center can ensure that cameras placed in the data center provide sufficient coverage of data center and specifically of the security-critical areas within the data center. FIG. 6 shows one example of a map view interface 600 that includes a graphical representation of a data center that can allow a user to determine blind spots. The interface displays one room of the data center 602, a camera 604, various enclosures and cabinets located within the data center arranged in parallel rows 606, as well as various devices located within the cabinets and enclosures 608. The devices can be associated with the camera as discussed above with reference to method 300. As shown in FIG. 6, the camera's coverage area 610 can be graphically represented on the map view interface as a partially transparent segment of a circle emanating from the camera. The devices A, B and C that are associated with the camera 604 are located within the representation of the camera's coverage area 610.

In one example, the icons representing the camera 604, the coverage area 610, and the devices 608 can be superimposed on any image representing the data center. This image can be any graphical representation of the datacenter, for example a schematic diagram, a blue print, or a photograph. The graphical representation can be 2D or a 3D representation of the data center. To assist in depicting the outer bounds of the camera's coverage area, a system of Cartesian coordinates can be established for the data center image. Each pixel in the image of the data center can be analyzed, represented and stored as a set of Cartesian coordinates (X-Y), with the top left corner of the image as the origin of the coordinate (0,0).

Each device 608 in the image can be represented as an icon with one or more vertices located at one or more vertex points; each vertex having a set of X-Y coordinates. For example, the icon can have a rectangular shape with four vertices. The camera 604 in the image can be represented as an icon having a set of X-Y coordinates located at a center of the camera icon. The camera can also be represented as an icon located at a single vertex point. The location of each device 608 in the image can be stored using the X-Y coordinates of one of the vertices of the icon, for example the top left corner vertex.

Figure 7:
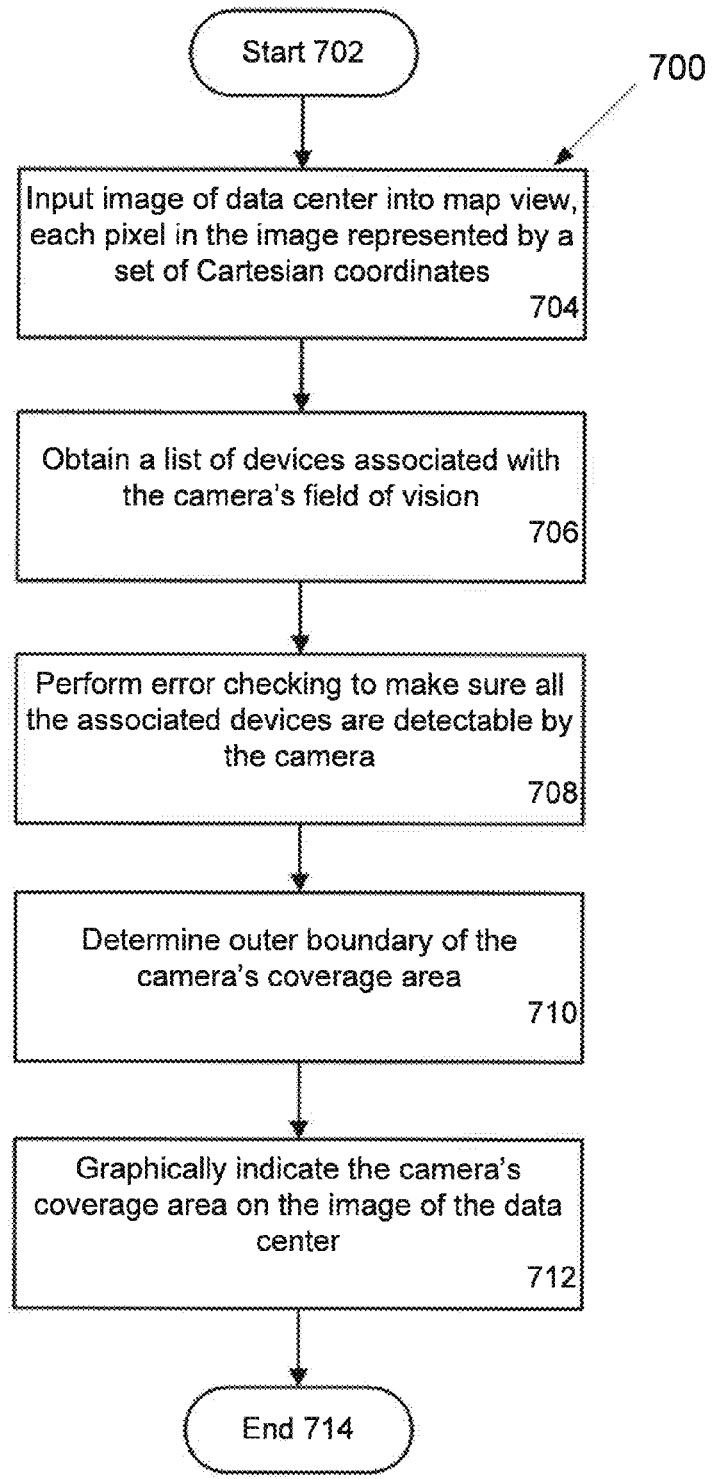
FIG. 7 is a flow diagram of a method of graphically indicating a camera's coverage area within a graphical representation of data center according to one embodiment.

FIG. 7 shows one example process 700 for determining a coverage area of a camera according to one embodiment. At block 702, the process begins. At block 704, an image representing the data center can be input into the map view interface. Each pixel of the image can be represented by a set of Cartesian coordinates, with each device and the camera in the image represented with at least one set of coordinates, as described above. At block 706, a list of devices within a coverage area of each camera in the data center can be obtained, as described above with regard to process 300.

At block 708, the relative position of the devices in relation to the camera can be determined. For example, the relative position of the devices can be to the left or right of the camera, or above or below the camera. In one example, the relative position of the devices is determined as a check to ensure the devices associated with the coverage area are detectable by the camera. The relative position can be iteratively confirmed for the devices associated with the camera, for example by presenting the user with a series of prompts. In one example, if the user does not confirm the relative position of the devices or if one or more of the devices do not have a relative position in relation to the camera, the data center management system can display an error message to the user. In one example, the user can correct the association of the devices with the camera's coverage area and retry the relative position process. In another example, the user can ignore the message and proceed to determine the outer boundaries of the coverage area.

At block 710, the outer boundary of the camera's coverage area can be determined, for example by determining at least two points in the image representing the data center that mark the outer boundaries of one or more devices associated with the camera. At block 712, the camera's coverage area in the image of the data center can be graphically indicated. In one example, the graphical indication can be in the form of segment of a circle representing the outer boundaries and emanating from the camera. The segment of the circle may encompass the camera icon and the at least two points marking the outer boundaries. Other graphical indications can be used to show the coverage area. For instance, in one example, the graphical indications may include one or more lines connecting the camera coordinates to the coordinates of the devices associated with the camera and one or more lines connecting the coordinates of the devices to each other. The process ends at block 714.

Figure 8:
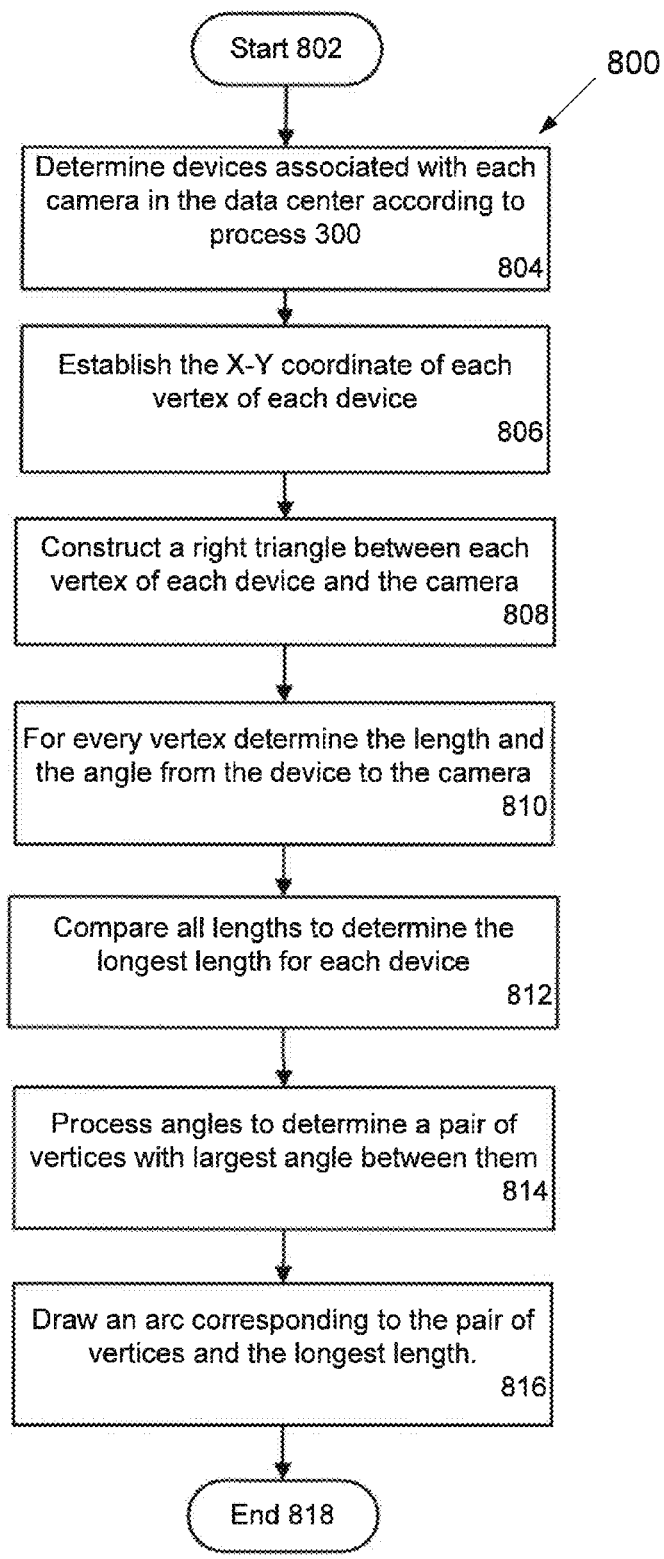
FIG. 8 is a flow diagram of a method of determining outer bounds a camera's coverage area within a graphical representation of data center according to one embodiment.

FIG. 8 shows one example process 800 for graphically representing a camera's coverage area according to one embodiment. This process can be performed for every camera in the data center to determine the devices and areas that are within or outside the coverage areas of the cameras. At block 802, the process begins. At block 804, devices associated with the camera can be determined according to process 300 for one of the cameras in the map view interface representation of the data center. At block 806, the X-Y coordinate of each vertex of each device and the X-Y coordinate of the camera can be established as described above. At block 808, a right triangle can be constructed between each vertex of each device and the camera, with the hypotenuse of each right triangle being formed by a line between each vertex of a device and the camera and the legs of each right triangle being formed parallel with respect to either the X axis or the Y axis. At block 810, the length of the hypotenuse and the measurement of the angle having the camera as one of its vertices (i.e. camera angle) can be determined using the X-Y coordinates. In one example, the measurement of the camera angle and the length of the hypotenuse are determined using the Pythagorean Theorem. The lengths and the measurements of the camera angles for each device can be stored into memory. At block 812 the stored lengths can be iteratively compared to determine the longest length for each device as well as the longest overall length.

At block 814, the stored measurements of the camera angles are processed to determine the largest angle (having the camera as one of its vertices and being formed by the camera and a pair of vertex points) of the one or more devices. In one example, the largest angle for a device is determined by calculating measurements for all of the camera angles, those having the camera as a vertex and being formed by the camera and a discrete pair of vertex points of a device. In some examples, the calculation is performed by, at least in part, adding each camera angle determined in block 810 above from each vertex of a first device to create a plurality of summation angles for the first device. In the example where the device is a rectangle with four vertices (i.e. A, B, C, and D), each angle (formed by two of the four vertices and the camera as a vertex) is added to each other angle to produce six summation angles (i.e. A-Z-B, A-Z-C, A-Z-D, B-Z-C, B-Z-D, and C-Z-D where Z represents the camera). The summation angles for the first device are iteratively compared to every other to determine the largest summation angle. In one example, the largest angle for the first device is representative of the coverage area and can be stored into memory.

In the same example, if another device is associated with the camera's coverage area, the measurement of each angle determined in block 810 above from each vertex of the second device is added to the measurement of each angle from each vertex of the first device to create a plurality of summation angles for the first and second devices. For example, if both devices are rectangles each with four vertices (A1, B1, C1, D1 and A2, B2, C2, D2), processing the angles results in 16 summation angles (A1-Z-A2, A 1-Z-B2, A 1-Z-C2, A 1-Z-D2, B1-Z-A2, B1-Z-B2, etc. where Z represents the camera as a vertex). The summation angles can be iteratively compared to each other to determine the largest summation angle for the two devices. The largest summation angle can be representative of the coverage area of the camera and can be stored into memory. The acts in block 814 can be repeated for any other device associated with the coverage area to determine the pair of vertex points forming with the largest angle with the camera as a vertex.

At block 816 two lines can be drawn from the camera coordinates through the pair of vertices with the largest summation angle between them. An arc may be drawn that connects the two lines and represents the outer boundaries of the coverage area of the camera. The radius of the arc may correspond to the longest length stored at block 812 and the arc angle may correspond to the largest summation angle stored at block 814. The process ends at block 818.

Figure 9:
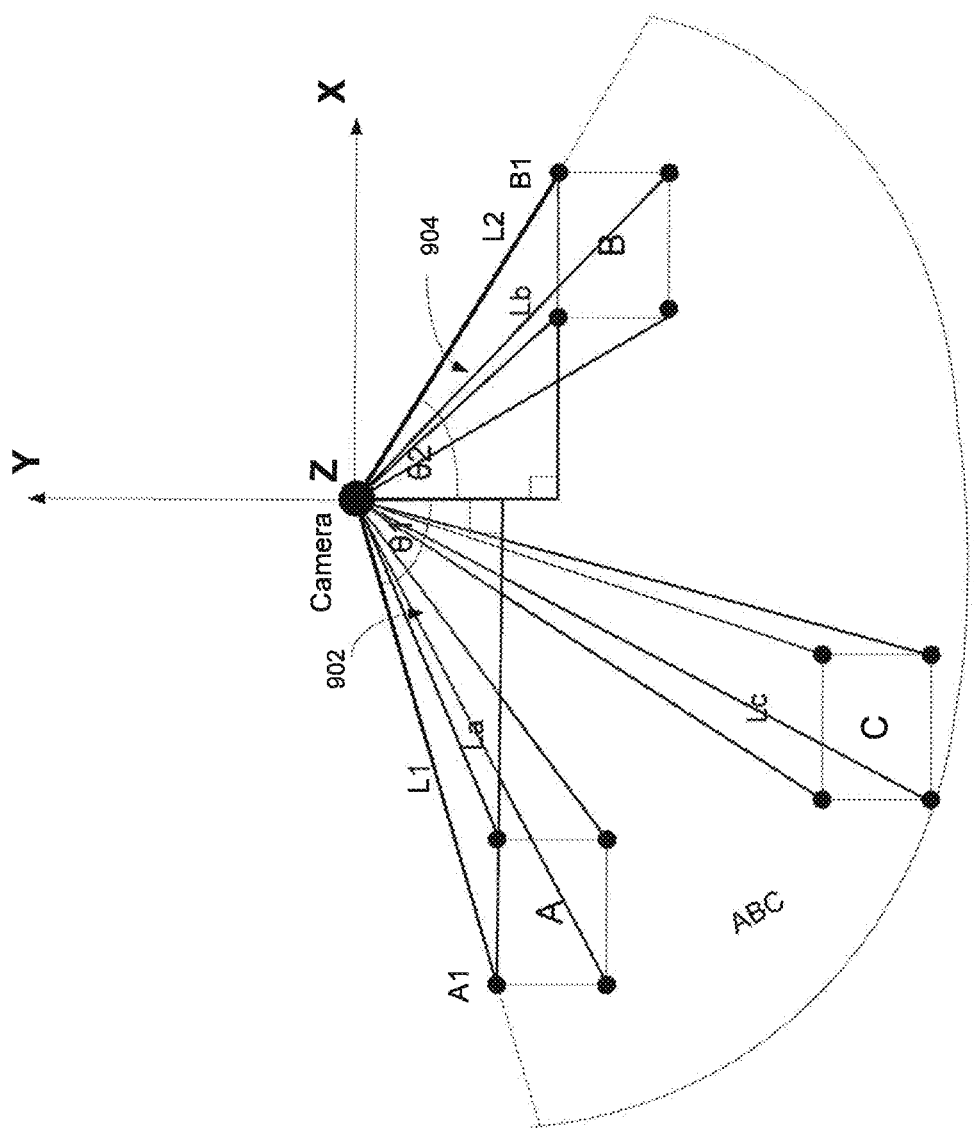
FIG. 9 is a schematic diagram illustrating one example of the method of determining outer bounds of the camera's coverage area according to one embodiment of the present invention.

FIG. 9 shows one example of using the process 800 for depicting the outer boundaries of the coverage area of camera Z using devices A, B and C. As shown in FIG. 9, the devices A, B and C are associated with the camera's coverage area. A right angle triangle is constructed using each vertex of each device A, B and C, the X-Y axis and the camera Z (block 808). As shown in FIG. 9, a right angle triangle 902 for vertex A1 is formed with vertex A1, the camera Z and the X-Y axis. Angles and lengths are determined between every vertex of devices A, B and C and the camera Z (block810), for example for vertex A1, the angle is θ1 and the length is L1. The lengths are compared to determine the longest length for each device and the overall longest length (block 812). The longest lengths for A, B, and C are labeled La, Lb, and Lc with Lc being the overall longest length.

The angles are processed to determine a pair of vertices with the largest angle between them (block 814) and having the camera as one of its vertices. In this example, angles θ1 and θ2, both having the camera as one of its vertices, are added together to form the largest summation angle. Lines L1 and L2 are drawn from the camera Z to the pair of vertices corresponding to the largest angle. L1 and L2 connect to an arc (ABC) drawn from point A1 to B1 with the longest length Lc forming the radius of the arc ABC.

The processes 700 and 800 can be repeated for every camera in the data center resulting in a depiction of one or more coverage areas in the map view interface. After the coverage area is depicted, the user can determine which devices or features in the data center are within or are outside one of the coverage areas visually depicted in the interface. Based on this information the user can install additional cameras in the data center, move cameras to encompass different locations and devices or move devices to be within the coverage area of one of the cameras. Further, by simply knowing the location of the blind spots security personnel can be alert to potential security threats associated with those areas.

Computer System

As discussed above with regard to FIG. 1, various aspects and functions may be implemented as specialized hardware or software executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 10:
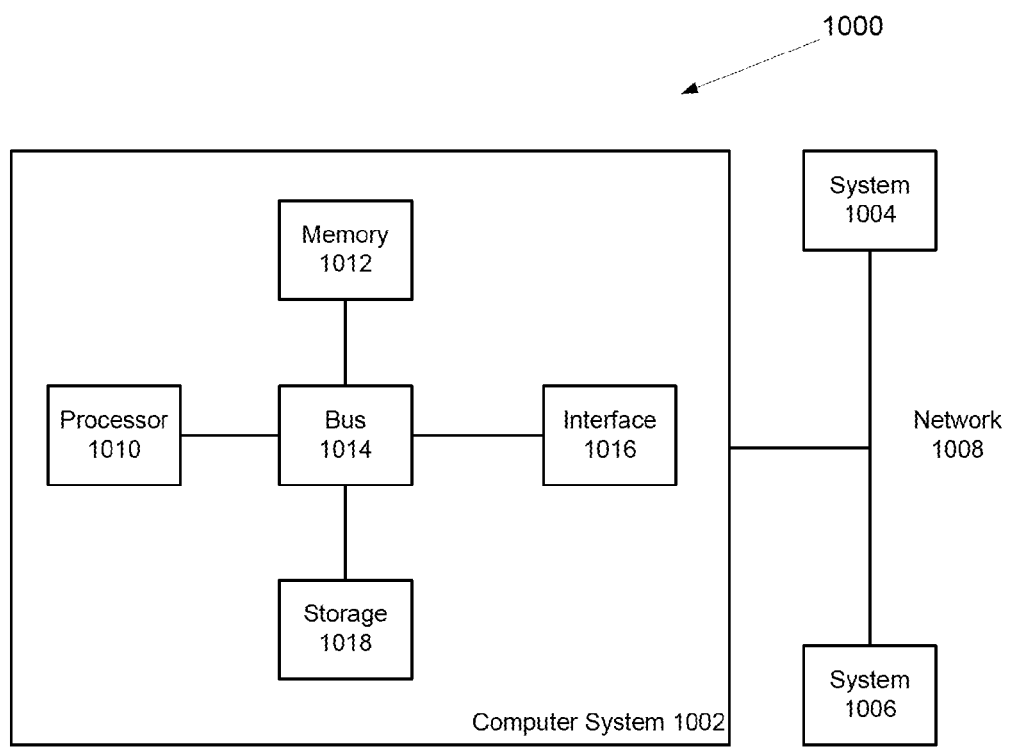
FIG. 10 is a block diagram of one example of a computer system that may be used to perform processes and functions disclosed herein.

Referring to FIG. 10, there is illustrated a block diagram of a distributed computer system 1000, in which various aspects and functions may be practiced. The distributed computer system 1000 may include one more computer systems that exchange (i.e. send or receive) information. For example, as illustrated, the distributed computer system 1000 includes computer systems 1002, 1004 and 1006. As shown, the computer systems 1002, 1004 and 1006 are interconnected by, and may exchange data through, a communication network 1008. The network 1008 may include any communication network through which computer systems may exchange data. To exchange data using the network 1008, the computer systems 1002, 1004 and 1006 and the network 1008 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1002, 1004 and 1006 may transmit data via the network 1008 using a variety of security measures including, for example, TLS, SSL or VPN. While the distributed computer system 1000 illustrates three networked computer systems, the distributed computer system 1000 is not so limited and may include any number of computer systems and computing devices, networked using any medium and communication protocol.

As illustrated in FIG. 10, the computer system 1002 includes a processor 1010, a memory 1012, a bus 1014, an interface 1016 and data storage 1018. The processor 1010 may perform a series of instructions that result in manipulated data. The processor 1010 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 1010 is connected to other system components, including one or more memory devices 1012, by the bus 1014.

The memory 1012 may be used for storing programs and data during operation of the computer system 1002. Thus, the memory 1012 may be a relatively high performance, volatile, random access memory such as a dynamic random access memory (DRAM) or static memory (SRAM). However, the memory 1012 may include any device for storing data, such as a disk drive or other non-volatile storage device. Various examples may organize the memory 1012 into particularized and, in some cases, unique structures to perform the functions disclosed herein and these data structures may be tailored to store values for particular types of data.

Components of the computer system 1002 may be coupled by an interconnection element such as the bus 1014. The bus 1014 may include one or more physical busses, for example, busses between components that are integrated within a same machine, but may include any communication coupling between system elements including specialized or standard computing bus technologies such as IDE, SCSI, PCI and InfiniBand. Thus, the bus 1014 enables communications, such as data and instructions, to be exchanged between system components of the computer system 1002.

The computer system 1002 also includes one or more interface devices 1016 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1002 to exchange information and communicate with external organizations, such as users and other systems.

The data storage 1018 may include a computer readable and writeable nonvolatile (non-transitory) data storage medium in which instructions are stored that define a program or other object that may be executed by the processor 1010. The data storage 1018 also may include information that is recorded, on or in, the medium, and this information may be processed by the processor 1010 during execution of the program. More specifically, the information may be stored in one or more data structures specifically configured to conserve storage space or increase data exchange performance. The instructions may be persistently stored as encoded signals, and the instructions may cause the processor 1010 to perform any of the functions described herein. The medium may, for example, be optical disk, magnetic disk or flash memory, among others. In operation, the processor 1010 or some other controller may cause data to be read from the nonvolatile recording medium into another memory, such as the memory 1012, that allows for faster access to the information by the processor 1010 than does the storage medium included in the data storage 1018. The memory may be located in the data storage 1018 or in the memory 1012, however, the processor 1010 may manipulate the data within the memory 1012, and then copy the data to the storage medium associated with the data storage 1018 after processing is completed. A variety of components may manage data movement between the storage medium and other memory elements and examples are not limited to particular data management components. Further, examples are not limited to a particular memory system or data storage system.

Although the computer system 1002 is shown by way of example as one type of computer system upon which various aspects and functions may be practiced, aspects and functions are not limited to being implemented on the computer system 1002 as shown in FIG. 10. Various aspects and functions may be practiced on one or more computers having a different architectures or components than that shown in FIG. 10. For instance, the computer system 1002 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1002 may be a computer system including an operating system that manages at least a portion of the hardware elements included in the computer system 1002. In some examples, a processor or controller, such as the processor 1010, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 1010 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, functional components disclosed herein may include a wide variety of elements, e.g. executable code, data structures or objects, configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

The above defined processes 300, 700 and 800, according to one embodiment of the invention, may be implemented using data center management applications discussed above or a general-purpose computer system as discussed with regard to FIG. 10 above. In addition, various aspects of the invention may be implemented as specialized software executing in a general-purpose computer system 1000 such as that shown in FIG. 10.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A method for depicting a coverage area of a camera within a graphical representation of a data center, the method comprising:
    establishing, by a computer, a representation of the camera within the graphical representation of the data center;
    determining at least two devices associated with the camera, including a first device and a second device;
    establishing representations of the at least two devices within the graphical representation of the data center, the representations of the first device and the second device having at least one vertice marking an outer boundary of each device;
    defining the coverage area based on the at least one vertice of the first device, the at least one vertice of the second device, and the representation of the camera such that a first outer edge of the coverage area extends from the at least one vertice of the first device to the representation of the camera, and a second outer edge of the coverage area extends from the at least one vertice of the second device to the representation of the camera; and
    displaying the coverage area within the graphical representation of the data center.

2. The method of claim 1, further comprising displaying the representations of the at least two devices within the coverage area and a representation of another device outside the coverage area.

3. The method of claim 1, wherein displaying the coverage area further comprises depicting the coverage area as a circle segment encompassing the representation of the camera and the at least one vertice of the first device and the at least one vertice of the second device.

4. The method of claim 1, further comprising establishing a coordinate system within the graphical representation of the data center,
    wherein establishing the representation of the camera within the graphical representation of the data center further comprises determining camera coordinates within the coordinate system that mark the representation of the camera within the graphical representation of the data center, and
    wherein establishing the representations of the at least two devices within the graphical representation of the data center comprises determining a plurality of vertex coordinates within the coordinate system that mark the at least one vertice, each of the plurality of vertex coordinates corresponding to a respective vertice, and
    wherein defining the coverage area based on the at least one vertice of the first device, the at least one vertice of the second device, and the representation of the camera further comprises determining a set of outer boundary coordinates for the coverage area within the coordinate system based on the at least one vertice of the first device and the at least one vertice of the second device relative to the camera coordinates.

5. The method of claim 4, wherein determining the set of outer boundary coordinates includes:
calculating a length between at least one set of vertex coordinates of the plurality of vertex coordinates and the camera coordinates; and
calculating an angle defined by the camera coordinates, a first subset of the plurality of vertex coordinates and a second subset of the plurality of vertex coordinates, the angle having a vertex defined by the camera coordinates.

6. The method of claim 5, wherein calculating the length further comprises establishing a right triangle with a hypotenuse between the at least one set of vertex coordinates and the camera coordinates.

7. The method of claim 5, wherein the at least two devices includes a first device having at least one first vertex marked within the coordinate system by a first set of vertex coordinates and a second device having at least one second vertex marked within the coordinate system by a second set of vertex coordinates, and calculating the angle comprises calculating a total angle defined by the camera coordinates, the first set of vertex coordinates and the second set of vertex coordinates, the total angle having a vertex defined by the camera coordinates.

8. The method of claim 5, further comprising:
determining an arc radius by comparing the length to at least one other length calculated between the camera coordinates and at least one second set of vertex coordinates of the plurality of vertex coordinates; and
determining an arc angle by comparing the angle to at least one other angle defined by the camera coordinates, a first set of vertex coordinates marking at least one first vertex of the plurality of vertices and a second set of coordinates marking at least one second vertex of the plurality of vertices, the at least one other angle having a vertex defined by the camera coordinates.

9. The method of claim 8, wherein displaying the coverage area further comprises depicting an arc having the arc angle and the arc radius.

10. A system for displaying a coverage area of a camera within a graphical representation of a data center, the system comprising:
an input device configured to:
receive a graphical representation of the data center;
at least one processor coupled to the input device and configured to:
establish a representation of the camera within the graphical representation of the data center;
determine at least two devices associated with the camera, including a first device and a second device;
establish representations of the at least two devices within the graphical representation of the data center, the representation of the first device and the second device having at least one vertice marking an outer boundary of each device; and
define the coverage area based on the at least one vertice of the first device, the at least one vertice of the second device, and the representation of the camera such that a first outer edge of the coverage area extends from the at least one vertice of the first device to the representation of the camera, and a second outer edge of the coverage area extends from the at least one vertice of the second device to the representation of the camera; and
an output device coupled to the at least one processor and configured to:
display the coverage area within the graphical representation of the data center.

11. The system of claim 10, wherein the output device is further configured to display the representations of the at least two devices within the coverage area and a representation of another device outside the coverage area.

12. The system of claim 10, wherein the at least one processor is further configured to depict the coverage area as a circle segment encompassing the representation of the camera and the at least one vertice of the first device and the at least one vertice of the second device.

13. The system of claim 10, wherein the at least one processor is further configured to establish a coordinate system within the graphical representation of the data center,
wherein the at least one processor is further configured to establish the representation of the camera by determining camera coordinates within the coordinate system that mark the representation of the camera within the graphical representation of the data center, and
wherein the at least one processor is further configured to establish the representations of the at least two devices within the graphical representation of the data center by determining a plurality of vertex coordinates within the coordinate system that mark the at least one vertice, each of the plurality of vertex coordinates corresponding to a respective vertice, and
wherein the at least one processor is further configured to define the coverage area based on the at least one vertice of the first device, the at least one vertice of the second device, and the representation of the camera by determining a set of outer boundary coordinates for the coverage area within the coordinate system based on the at least one vertice of the first device and the at least one vertice of the second device relative to the camera coordinates.

14. The system of claim 13, wherein the at least one processor is further configured to:
calculate a length between at least one set of vertex coordinates of the plurality of vertex coordinates and the camera coordinates; and
calculate an angle defined by the camera coordinates, a first subset of the plurality of vertex coordinates and a second subset of the plurality of vertex coordinates, the angle having a vertex defined by the camera coordinates.

15. The system of claim 14, wherein the at least one processor is further configured to calculate the length by establishing a right triangle with a hypotenuse between the at least one set of vertex coordinates and the camera coordinates.

16. The system of claim 14, wherein the at least two devices includes a first device having at least one first vertex marked within the coordinate system by a first set of vertex coordinates and a second device having at least one second vertex marked within the coordinate system by a second set of vertex coordinates, and
wherein the at least one processor is further configured to calculate the angle by calculating a total angle defined by the camera coordinates, the first set of vertex coordinates and the second set of vertex coordinates, the total angle having a vertex defined by the camera coordinates.

17. The system of claim 14, wherein the at least one processor is further configured to:

determine an arc radius by comparing the length to at least one other length calculated between the camera coordinates and at least one second set of vertex coordinates of the plurality of vertex coordinates; and determine an arc angle by comparing the angle to at least one other angle defined by the camera coordinates, a first set of vertex coordinates marking at least one first vertex of the plurality of vertices and a second set of vertex coordinates marking at least one second vertex of the plurality of vertices, the at least one other angle having a vertex defined by the camera coordinates.

18. The system of claim 17, wherein the at least one processor is further configured to display the coverage area by depicting an arc having the arc angle and the arc radius.

19. A non-transitory computer readable medium for displaying a coverage area of a camera within a graphical representation of a data center having stored thereon sequences of instruction including instructions that will cause at least one processor to:

establish representation of the camera within the graphical representation of the data center;

determine at least two devices associated with the camera, including a first device and a second device;

establish representations of the at least two devices within the graphical representation of the data center, the representations of the first device and the second device having at least one vertice marking an outer boundary of each device;

define the coverage area based on the at least one vertice of the first device, the at least one vertice of the second device, and the representation of the camera such that a first outer edge of the coverage area extends from the at least one vertice of the first device to the representation of the camera, and a second outer edge of the coverage area extends from the at least one vertice of the second device to the representation of the camera; and display the coverage area within the graphical representation of the data center.

20. The non-transitory computer readable medium of claim 19, further including instructions that will cause the at least one processor to establish a coordinate system within the graphical representation of the data center, wherein the instructions that will cause the at least one processor to establish the representation of the camera include instructions that will cause the at least one processor to determine camera coordinates within the coordinate system that mark the representation of the camera within the graphical representation of the data center, wherein the instructions that will cause the at least one processor to establish the representations of the at least two devices within the graphical representation of the data center include instructions that will cause the at least one processor to determine a plurality of vertex coordinates within the coordinate system that mark the at least one vertice, each of the plurality of vertex coordinates corresponding to a respective vertice; and wherein the instructions that will cause the at least one processor to define the coverage area based on the at least one vertice of the first device, the at least one vertice of the second device, and the representation of the camera include instructions that will cause the at least one processor to determine a set of outer boundary coordinates for the coverage area within the coordinate system based on the at least one vertice of the first device and the at least one vertice of the second device relative to the camera coordinates.

* * * * *